No. 724,554. PATENTED APR. 7, 1903.
C. E. DAVIS.
APPARATUS FOR PRESERVING PERISHABLE FOOD PRODUCTS.
APPLICATION FILED FEB. 9, 1901.
NO MODEL.
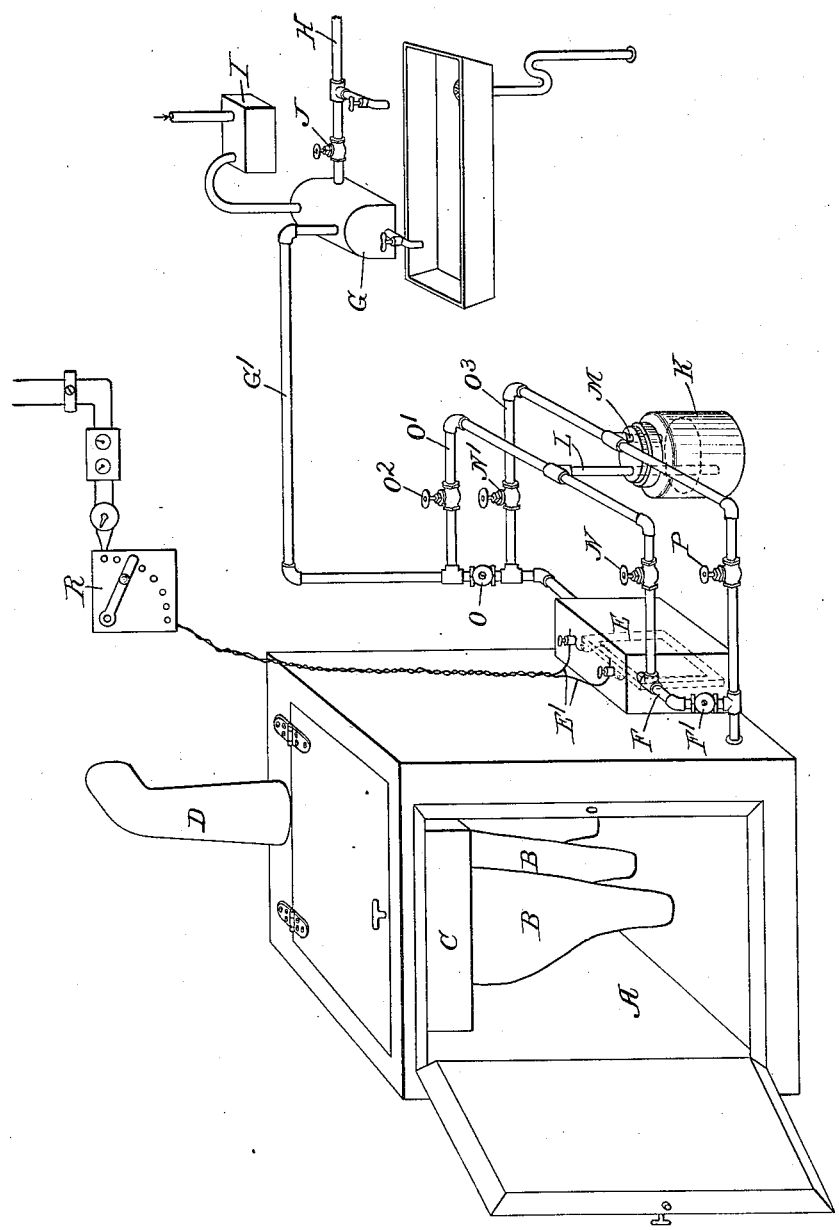
Witnesses.
Edward T. Wray.
Homer L. Kraft.
Inventor.
Charles E. Davis,
by Parker Carter
his Atty's.

UNITED STATES PATENT OFFICE.

CHARLES E. DAVIS, OF CHICAGO, ILLINOIS, ASSIGNOR TO ELMER A. SPERRY, OF CLEVELAND, OHIO.

APPARATUS FOR PRESERVING PERISHABLE FOOD PRODUCTS.

SPECIFICATION forming part of Letters Patent No. 724,554, dated April 7, 1903.

Application filed February 9, 1901. Serial No. 46,593. (No model.)

*To all whom it may concern:*

Be it known that I, CHARLES E. DAVIS, a citizen of the United States, residing at Chicago, in the county of Cook and State of Illinois, have invented a certain new and useful Improvement in Apparatus for Preservation of Perishable Food Products, of which the following is a specification.

My invention relates to an apparatus for the preservation of perishable food products, and is illustrated in the accompanying drawing, wherein—

A is a receptacle, preferably a refrigerator. Within it I have shown some food products B and the chamber C to contain ice or other means of refrigeration.

D is a flue or outlet.

E is what I call an "electrolyzer" or device for electrolyzing the atmospheric air. $E'$ $E'$ are conductors leading thence to the rheostat R.

F is a pipe leading from the electrolyzer to the refrigerator, controlled by the valve $F'$.

G is a compressor, operated in this case by water from the water-main H, which is controlled by the valve J, and by varying the temperature of the water supplied to it it serves as a temperature-varying device.

I (which may be charged with water or a filtering substance, or both, or, in the case of air too moist, with means for taking up such moisture) is a purifier for the atmospheric air, whence it passes into the compressor G, and $G'$ is a pipe leading from the compressor G to the electrolyzer, being controlled by the valve O.

$O'$ is a pipe leading from the pipe $G'$ and controlled by the valves $O^2$ and N.

L is a connection from the pipe $O'$ to the receptacle K. M is a like connection leading from the receptacle K to the pipe $O^3$, controlled by the valves P and $N'$. Thus it will be seen that the pipe $O'$ is connected with the pipe $G'$ above the valve O and with the pipe F above the valve $F'$ and that the pipe $O^3$ is connected with the pipe $G'$ below the valve O and with the pipe F below the valve $F'$.

The drawing will be understood to be diagrammatic, as I have not attempted to illustrate very accurately the precise devices or forms of construction shown.

The receptacle K is a vaporizer or generator having, as suggested, the induction L and the eduction M to connect it with the pipes above referred to. These parts may be more generally described as follows: A is a receptacle; E, the electrolyzer; G, the combined compressor and temperature-changer; I, the combined purifier and device for varying the humidity, and K is a vaporizer or generator by means of which certain additional vapors or gases may be generated to be incorporated with the air either before or after its electrolyzation. The electrolyzer is controlled by means of a rheostat R, with which it is connected with conductors $E'$. As previously suggested, the action of compressing the air or forcing this in through the pipes has no necessary connection with the action involved in raising and lowering the temperature; but for convenience I have combined these two parts of the apparatus in a single piece which performs both functions. The same statement may be made with reference to the combined device for changing the humidity of the atmosphere and for purifying the same.

The use and operation of my invention may be described as follows: The air is passed through the purifier and the device for varying the moisture if either or both of these appliances are desired. It passes thence into the compressor, though in some instances the natural draft is sufficient or may be so, and some other means (not indicated) could be employed for moving the current of treated air through the receptacle. If desired, the temperature can be varied in the particular case shown by varying the temperature of the water which operates the compressor or pump. It can readily be seen that by manipulating the six valves associated with the electrolyzer the air can be passed directly through the electrolyzer into the receptacle, or through the electrolyzer and then through the generator and then into the receptacle, or through the generator and then through the electrolyzer and then into the receptacle. In the electrolyzer the air is subjected to intense static electrolyzation, and in the generator it has incorporated with it additional gaseous matters, such as those which may arise from turpentine or fusel-oil or other substances, as required in the particular cases to which the machine is being applied.

Some of the results accomplished are the following: The air properly treated is carried in a continuous current around and over the product to be treated, and this treatment takes place even when the door of the receptacle is open. All the substances of which the air is composed are introduced—that is, the air in a treated condition is employed as distinguished from the employment of a portion of the air or certain gases extracted from the air. The air can be varied as to moisture and temperature before use. The air can also be charged with additional gases. The air so charged with additional gases can be electrolyzed.

I have not thought it necessary to make any further showing of the electrolyzer; but any of the well-known forms can be used—as, for example, the Siemens, which consists of concentric or parallel plates of high insulation, such as glass coated with a conducting material, such as tin-foil, or silent-discharge static effect. With this a step-up transformer may be used, if desired. The generator or wash-bottle is of any ordinary form, and in the arrangement shown the material out of which the additional gas is to be formed is introduced into the circulating system and the gases pass the liquid by bubbling up through it, both of the entering tubes passing through the cork of the bottle.

I claim—

1. An apparatus for treating perishable products, comprising a confined chamber to receive such products, means for electrolyzing air, and means for bringing said electrolyzed air into contact with said perishable products while the gases in the electrolyzed air are in an active and nascent state, as set forth.

2. An apparatus for treating perishable products, comprising a confined chamber to receive such products, means for electrolyzing air, and means for bringing a continuous current of said electrolyzed air into said chamber and into contact with said perishable products while the gases in the electrolyzed air are in an active and nascent state, as set forth.

3. An apparatus for treating perishable products, comprising a confined chamber to receive such products, means for electrolyzing air, and means for bringing said electrolyzed air associated with preservative substances into contact with said perishable products while the gases in the electrolyzed air are in an active and nascent state, as set forth.

4. An apparatus for treating perishable products, comprising a confined chamber, means for varying the temperature of air, means for electrolyzing the air, and means for bringing said electrolyzed air into contact with said perishable products while the gases in the electrolyzed air are in an active and nascent state, as set forth.

5. An apparatus for treating perishable products, comprising a confined chamber, means for purifying air, means for electrolyzing the air, and means for bringing said electrolyzed air into contact with said perishable products while the gases in the electrolyzed air are in an active and nascent state, as set forth.

6. An apparatus for treating perishable products, comprising a confined chamber, means for purifying air, means for varying the temperature of the air, means for electrolyzing the purified and tempered air, and means for bringing said electrolyzed air into contact with said perishable products while the gases in the electrolyzed air are in an active and nascent state, as set forth.

7. An apparatus for treating perishable products, comprising a confined chamber, means for dampening air, means for electrolyzing the dampened air, and means for bringing said electrolyzed air into contact with said perishable products while the gases in the electrolyzed air are in an active and nascent state, as set forth.

8. An apparatus for treating perishable products, comprising a confined chamber, means for both dampening and pumping air, means for electrolyzing the dampened air, and means for bringing said electrolyzed air into contact with said perishable products while the gases in the electrolyzed air are in an active and nascent state, as set forth.

9. An apparatus for treating perishable products, comprising a confined chamber, a vessel having air and water inlets, means for receiving and electrolyzing the air from said vessel, and means for bringing said electrolyzed air into contact with said perishable products while the gases in the electrolyzed air are in an active and nascent state, as set forth.

10. An apparatus for treating perishable products, comprising a confined chamber to receive such products, means for electrolyzing air, means for bringing said electrolyzed air into contact with said perishable products while the gases in the electrolyzed air are in an active and nascent state, and an inlet to said chamber independent of said electrolyzing means, as set forth.

11. An apparatus for treating perishable products, comprising a confined chamber to receive such products, means for electrolyzing air, means for bringing said electrolyzed air into contact with said perishable products while the gases in the electrolyzed air are in an active and nascent state, and a conduit having branches leading respectively to said electrolyzing means and to said chamber, as set forth.

12. An apparatus for treating perishable products, comprising a confined chamber, means for refrigerating the contents of said chamber, means for electrolyzing air, and means for bringing said electrolyzed air into contact with said perishable products while the gases in the electrolyzed air are in an active and nascent state, as set forth.

CHARLES E. DAVIS.

Witnesses:
HOMER L. KRAFT,
EDWARD T. WRAY.